(12) United States Patent
Smith

(10) Patent No.: US 6,443,423 B1
(45) Date of Patent: Sep. 3, 2002

(54) LOAD-PROFILE COMPENSATING STUFFING-BOX PACKING SYSTEM FOR VALVES HAVING STEMS OF UNIFORM CROSS-SECTION

(75) Inventor: Gordon M. Smith, Brookshire, TX (US)

(73) Assignee: General Valve, Inc., Brookshire, TX (US)

( * ) Notice: Subject to any disclaimer, the term of this patent is extended or adjusted under 35 U.S.C. 154(b) by 0 days.

(21) Appl. No.: 09/624,433

(22) Filed: Jul. 24, 2000

(51) Int. Cl.[7] .............................. F16K 31/44; F16J 15/18
(52) U.S. Cl. ........................................ 251/214; 277/529
(58) Field of Search .................................. 251/214, 900; 277/510, 529, 530, 531, 532, 534, 539, 540, 584

(56) References Cited

U.S. PATENT DOCUMENTS

| | | | | |
|---|---|---|---|---|
| 3,596,933 A | * | 8/1971 | Luckenbill | 285/246 |
| 5,044,606 A | * | 9/1991 | Wordin | 251/214 |
| 5,338,004 A | * | 8/1994 | Heil | 251/214 |
| 5,375,812 A | * | 12/1994 | Kent | 251/214 |
| 5,730,419 A | * | 3/1998 | Williams et al. | 251/214 |

* cited by examiner

Primary Examiner—Lesley D. Morris
Assistant Examiner—Patrick Buechner
(74) Attorney, Agent, or Firm—Leonard Tachner

(57) ABSTRACT

A valve packing system uniformly distributes the radial packing load in a valve stuffing box. In one embodiment the cylindrical wall of the stuffing box is tapered with a flat bottom. In other embodiments the cylindrical wall of the stuffing box is straight with a tapered outbound bottom, the bottom of the packing ring is tapered at the same outbound angle to match the outbound taper at the bottom of the cylindrical stuffing box, the cylindrical wall of the stuffing box is straight with a tapered inbound bottom, the bottom of the packing ring is tapered at the same inbound angle to match the inbound taper at the bottom of the cylindrical stuffing box, and the cylindrical wall of the stuffing box is straight with a male "V" x-section at the bottom of the stuffing box to accept a packing ring having a female "V" groove on the bottom.

8 Claims, 7 Drawing Sheets

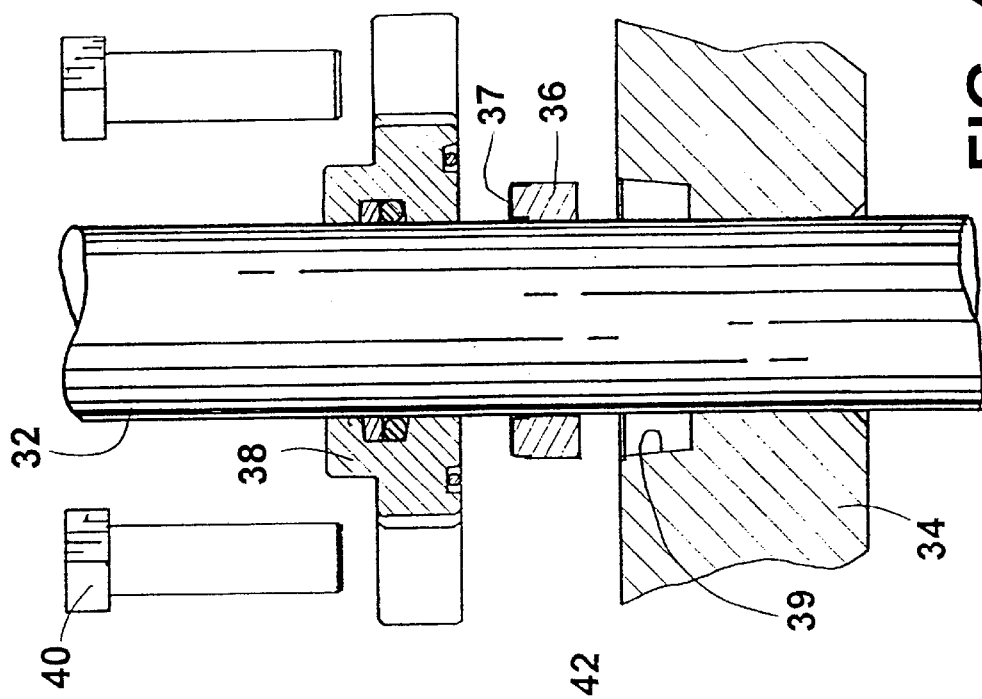
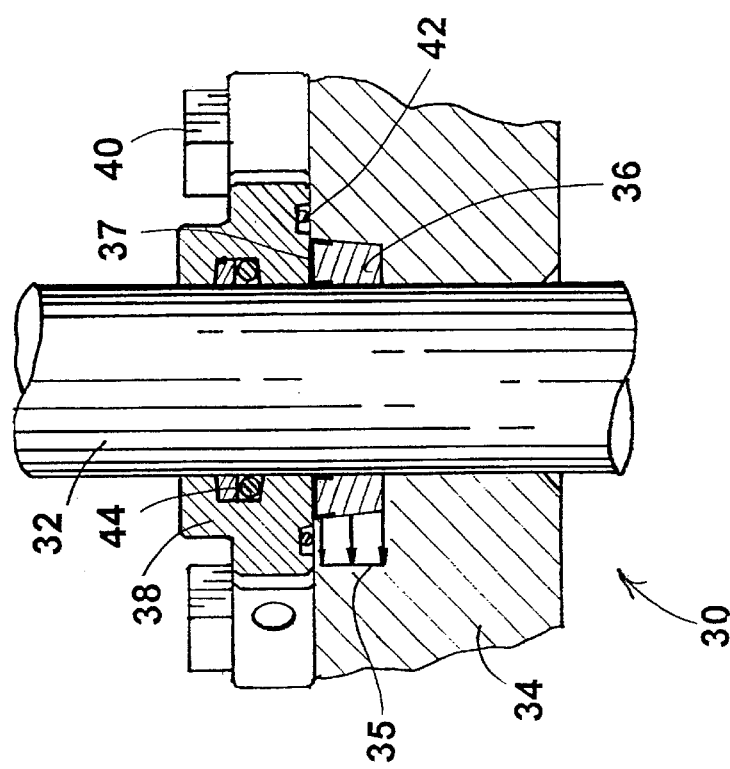

LOAD-PROFILE COMPENSATING STUFFING-BOX PACKING SYSTEM FOR VALVES HAVING STEMS OF UNIFORM CROSS-SECTION

BACKGROUND OF THE INVENTION

1. Field of the Invention

The present invention relates generally to valves which employ a stuffing box packing system and more particularly to load profile compensation in such a system.

2. Background Art

The current state-of-the-art of a stuffing box is a cylindrical box rectangular in cross-section filled with rectangular cross-section packing rings (typically a quantity of five rings per set). Through this packing protrudes a valve stem with a linear (up and down) motion. This packing is held in place by a packing gland with a register that fits into the stuffing box. This gland is held in place with fasteners that hold it to the valve bonnet. Furthermore, this packing has to be tightened to create a seal between the stem and packing and the packing and the stuffing box bore. The amount of axial load that is applied to the packing through the gland has to be sufficient to seal against the valve internal pressure. This axial load when applied, translates to a radial packing load to provide the sealing capability on the packing inner and outer surfaces. Radial packing load is at a maximum at the junction of the gland and the top packing ring and it decreases exponentially toward the second ring and below. Therefore, in reality most of this packing sealing is done by the top ring. Ideally, for service life it would be advantageous if the packing load can be transmitted uniformly through the entire group of rings without any reduction in this load to provide uniform wear.

When tightening a rectangular cross-section, graphitic packing, load is applied by tightening the valve gland bolts which exerts load on to the gland flange and thereby to the packing. The applied load acting in a vertical axis parallel to the stem and within the annulus of a valve stuffing box compresses initially the top ring of packing then successive rings with regard to an individual die formed packing ring. This compression causes the middle of each of the packing to bulge and eventually contact the stem and the walls of the stuffing box. Therefore, force from the gland bolts is transmitted into compressive pressure on the stem and stuffing box walls from the above described "transmission process." There is loss in transmitting this mechanical work. Such losses through friction and densification compression consolidation of the graphitic packing itself.

For 100% dense materials, Poisson's ratio (ratio of height change to related lateral expansion or contraction) is approximately 0.3 or 33% in the best case. However for flexible graphite packing materials for which 70–90 lb/ft$^3$ density is typical, flexible graphite is approximately 50–65% theoretical density. Therefore, when a flexible graphite packing is compressed, the work of axial compression is divided between increasing the local density of the packing and Poisson's expansion of the packing in the direction transverse to the application of force, i.e., radial load.

SUMMARY OF THE INVENTION

The present invention provides several alternative embodiments to uniformly distribute the radial packing load. As stated earlier, the last four of the conventional rings do a minimal amount of sealing, but they do add to the packing friction which, in turn, requires additional operator torque to move the valve stem. It is logical to consider, therefore, using only one packing ring and using this ring more effectively, which, in turn, reduces packing friction, operator torque, stem wear (corrosion, pitting, wear and tear) and lower maintenance costs by minimizing leaky packing replacements.

In a first embodiment of the invention the cylindrical wall of the stuffing box is conically tapered with a flat bottom. This stuffing box configuration is to be designed to accept rectangular cross-section packing. This configuration makes the radial packing load uniform throughout the packing ring elevation.

In a second embodiment the cylindrical wall of the stuffing box is straight with a tapered outbound bottom. This stuffing box configuration is designed to accept square cross-section packing. This configuration makes the radial packing load uniform throughout the packing ring elevation.

A third embodiment is similar to the second except the bottom of the packing ring is tapered at the same outbound angle to match the outbound taper at the bottom of the cylindrical stuffing box.

In a fourth embodiment the cylindrical wall of the stuffing box is straight with a tapered inbound bottom. This stuffing box configuration is designed to accept square cross-section packing. This configuration makes the radial packing load uniform throughout the packing ring elevation.

A fifth embodiment is similar to the fourth except the bottom of the packing ring is tapered at the same inbound angle to match the inbound taper at the bottom of the cylindrical stuffing box.

In a sixth embodiment the cylindrical wall of the stuffing box is straight with a male inverted "V" x-section at the bottom of the stuffing box. This stuffing box configuration is designed to accept a packing ring that is flat on the top, straight on the sides and has a female inverted "V" groove on the bottom. The bottom on the packing ring should mate with the bottom of the stuffing box. This configuration makes the radial packing load uniform through the packing ring.

OBJECTS OF THE INVENTION

It is therefore a principal object of the present invention to provide a non-rectangular cross-section stuffing box packing system for valve stems to result in a uniform radial load profile through the packing ring and thus increase sealing efficiency, reduce wear and maintenance.

It is another object of the invention to provide a tapered packing ring and stuffing box cross-section to more uniformly distribute radial forces and enhance service life by reducing local wear patterns as would be the result of non-uniform loading applied by the packing ring against the valve stem.

It is still another object of the invention to provide an improved stuffing box packing system for sealing valve stems, the improvement being in the cross-sectional shape of at least the stuffing box to more evenly distribute radial loading throughout the height of the packing ring.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIGS. 3 and 4 are views similar to FIGS. 1 and 2, but of a first embodiment of the invention;

DETAILED DESCRIPTION OF PREFERRED EMBODIMENTS

Figure 2:
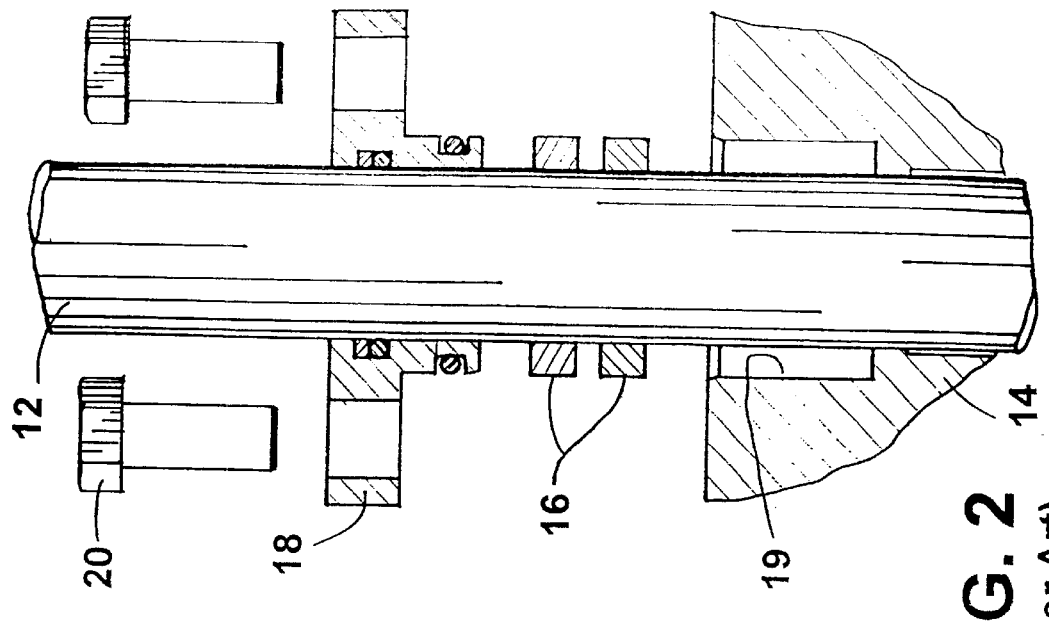
FIGS. 1 and 2 are partial cross-sectional and exploded views, respectively, of a conventional stuffing box packing system used to seal valve stems.
Figure 1:
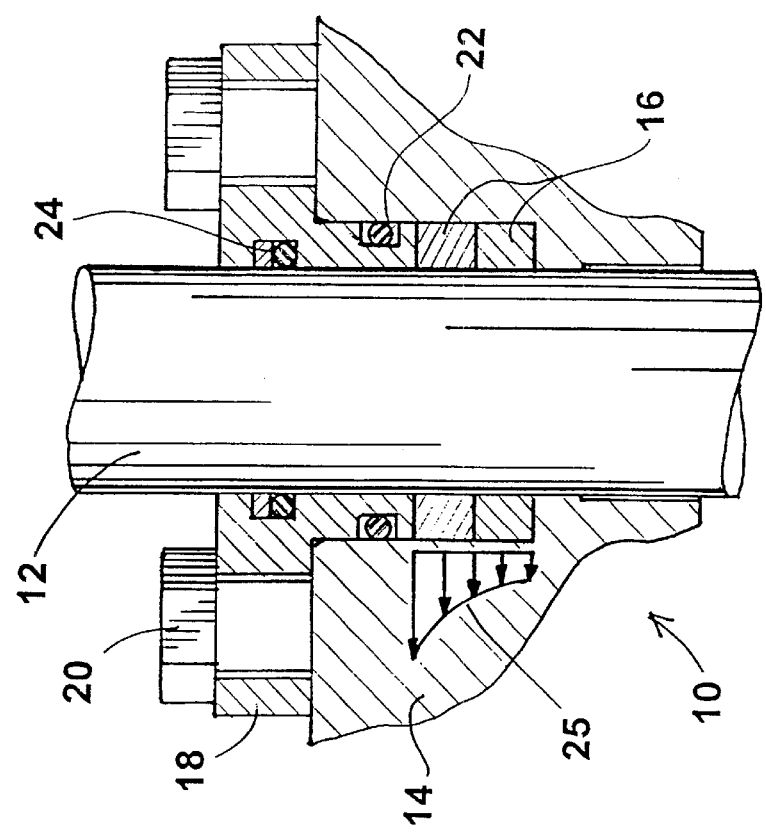

Referring to FIGS. 1 and 2, it will be seen that in a conventional valve stem assembly 10, a stem 12 passes through a valve bonnet 14 and is surrounded by a number of packing rings 16. The packing rings 16 are compressed into a stuffing box 19 by a packing gland 18 secured by a plurality of fasteners 20. Also included are O-rings 22 and O-ring and back-up ring 24. In this conventional assembly, the radial load profile 25 exhibits a tapered distribution with the uppermost portion of the uppermost packing ring bearing the greatest part of the radial load and the lower packing ring contributing very little to the radial load. This uneven load distribution reduces sealing efficiency and produces accelerated wear, particularly on the upper packing ring thereby requiring frequent maintenance.

FIGS. 3 and 4 show a first embodiment of the invention wherein the outer radial wall of the stuffing box is tapered in cross-section. More specifically, first embodiment assembly 30 comprises a stem 32 passing through a valve bonnet 34 and surrounded by a packing ring 36 retained in a stuffing box 39. Packing ring 36 is compressed in the stuffing box 39 by a packing gland 38 which is secured to the bonnet 34 by fasteners 40. O-ring 42 and O-ring and back-up ring 44 provide added sealing. Packing ring 36 is preferably provided with an annular cap 37 to resist extrusion of the packing ring due to compressive forces from packing gland 38. The key feature of this first embodiment is the tapered outer radial wall of stuffing box 39 which results in an evenly distributed radial load distribution profile 35 seen in FIG. 3 especially during consolidation.

Figure 6:
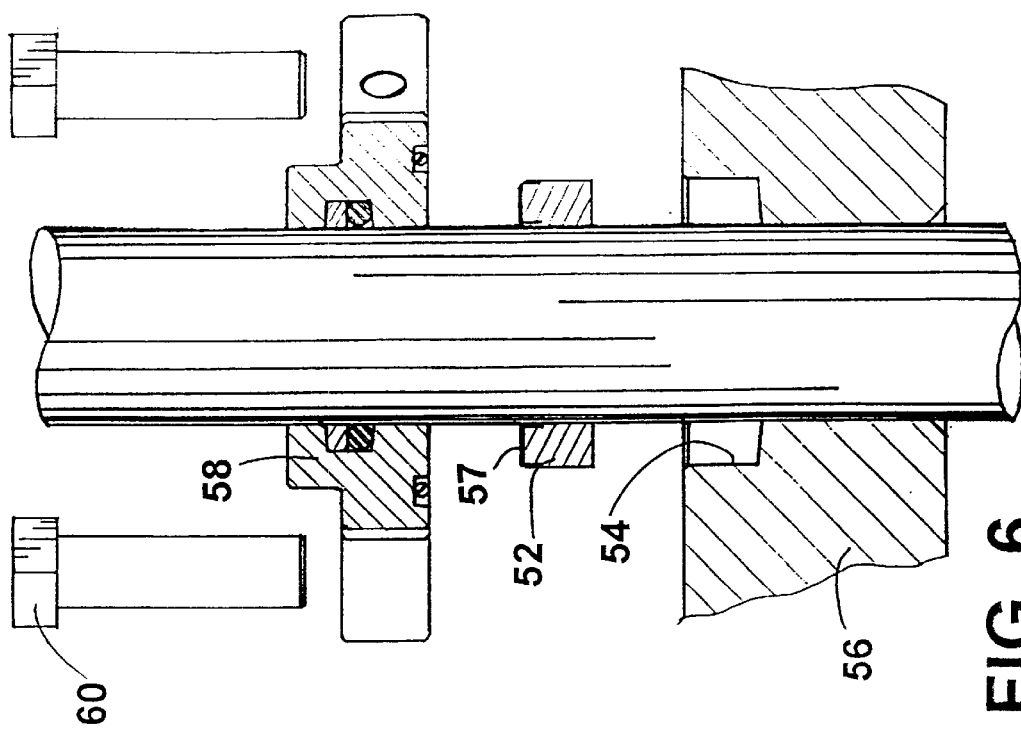
FIGS. 5 and 6 are views similar to FIGS. 1 and 2, but of a second embodiment of the invention.
Figure 5:
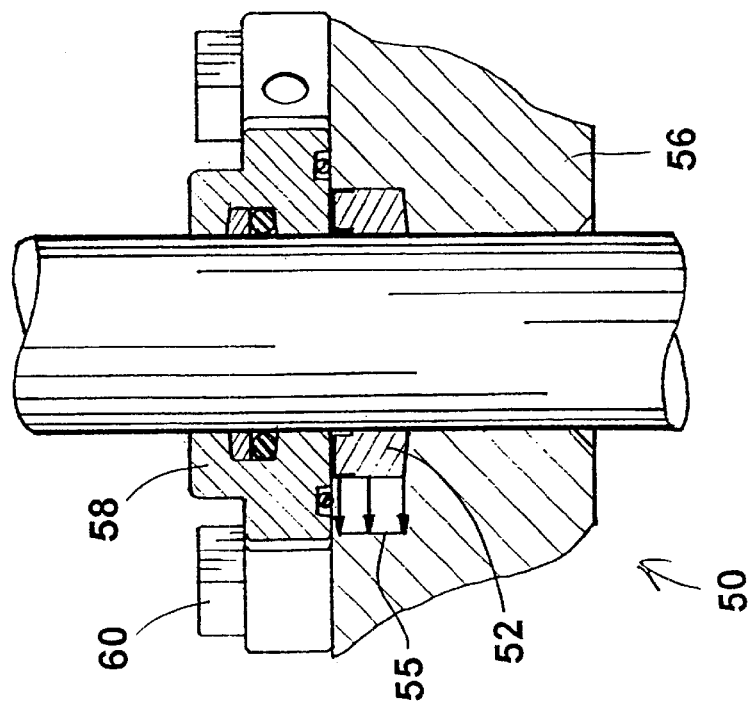

In FIGS. 5 and 6, a second embodiment assembly 50 is illustrated. This assembly also comprises a packing ring 52, a stuffing box 54 in a bonnet 56, a packing gland 58 and a plurality of packing gland fasteners 60. An anti-extrusion cap 57 is also provided. In this second embodiment, the lower axial surface of stuffing box 54 is tapered so that the box is longer at its inner radial surface than at its outer radial surface. This tapering also results in a more even radial load distribution profile 55 seen in FIG. 5.

Figure 8:
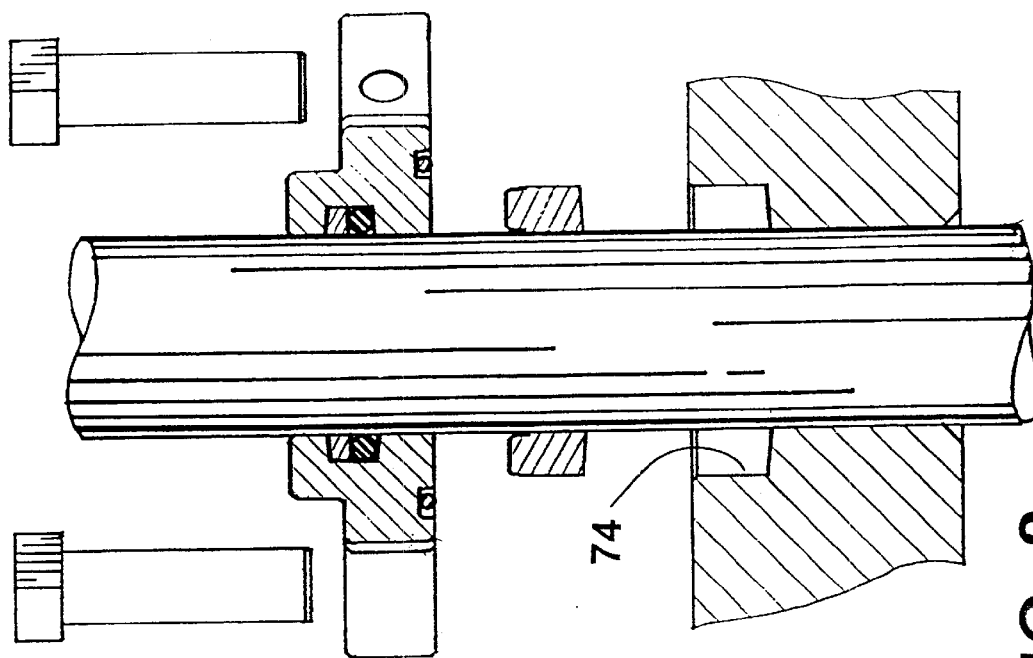
FIGS. 7 and 8 are views similar to FIGS. 1 and 2, but of a third embodiment of the invention.
Figure 7:
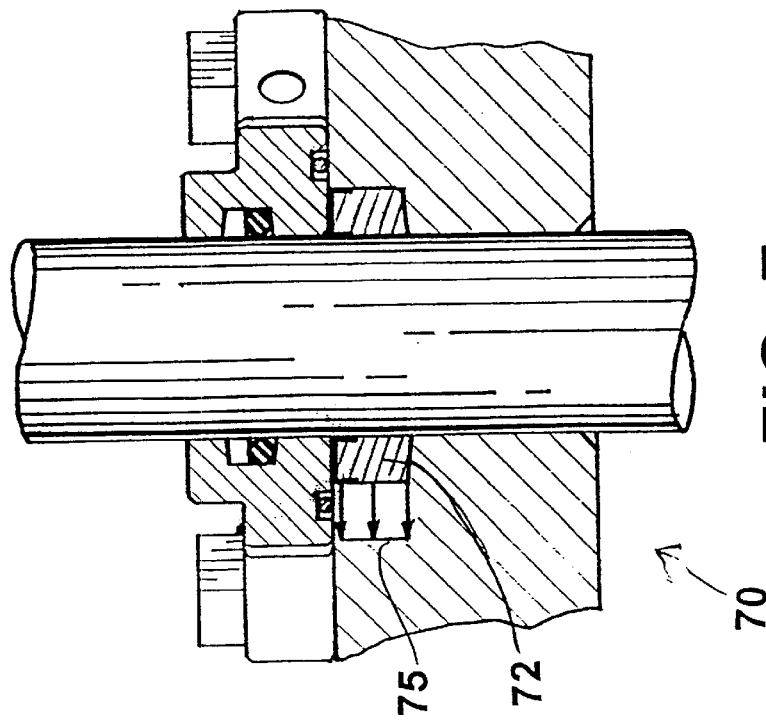

In FIGS. 7 and 8, a third embodiment assembly 70 is similar to the second embodiment of FIGS. 5 and 6 except for congruent tapering of the lower axial surface of the packing ring 72 to match the tapering of stuffing box 74. The radial load distribution profile 75 is also uniform as seen in FIG. 7.

Figure 10:
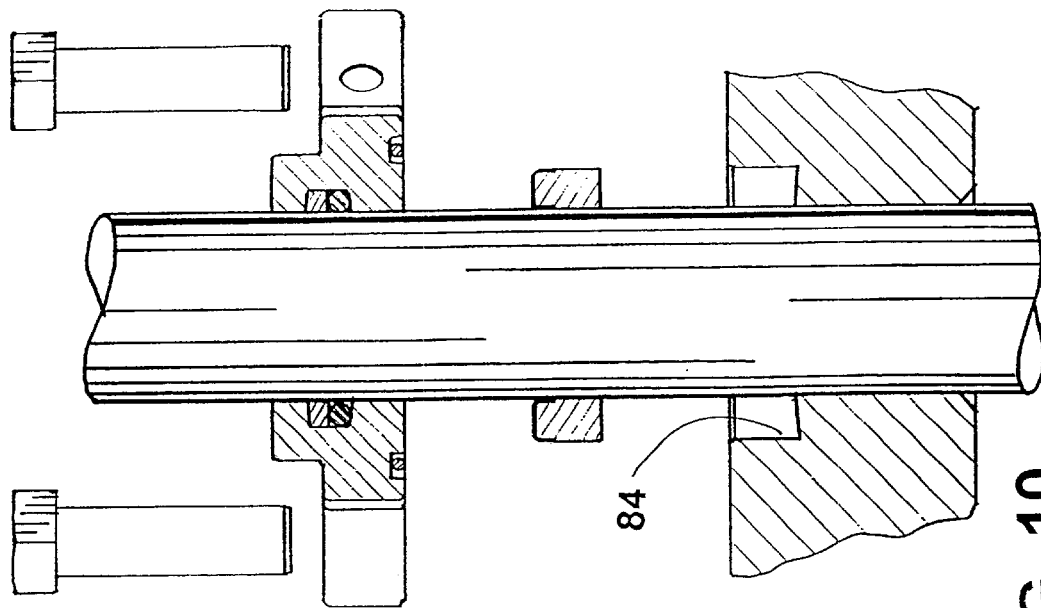
FIGS. 9 and 10 are views similar to FIGS. 1 and 2, but of a fourth embodiment of the invention.
Figure 9:
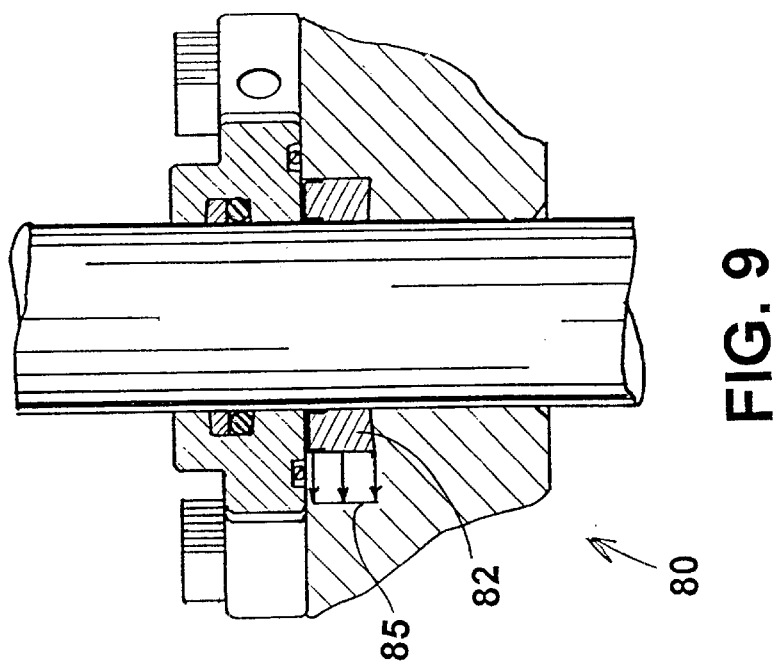

In FIGS. 9 and 10, a fourth embodiment assembly 80 has a rectangular cross-section packing ring 82 as in the second embodiment of FIGS. 5 and 6. However, in this case, the lower axial surface of the stuffing box is tapered in the opposite direction so that the length of the outer radial surface of box 84 is longer than the inner radial surface. This configuration also produces a more even radial load distribution profile 85 seen in FIG. 9.

Figure 12:
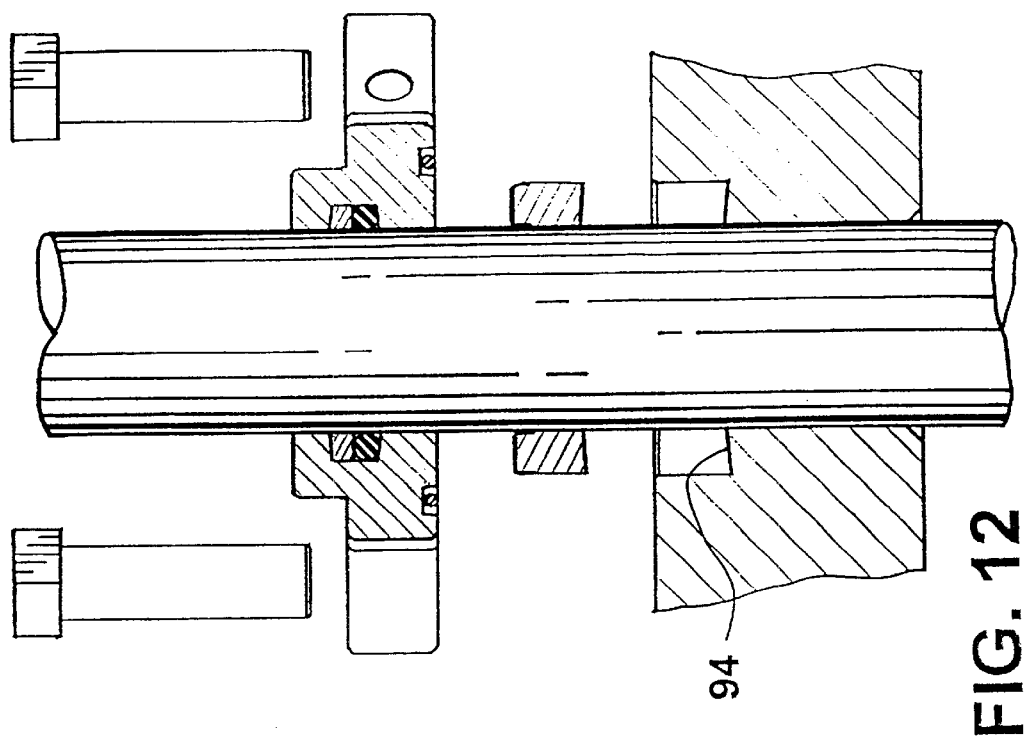
FIGS. 11 and 12 are views similar to FIGS. 1 and 2, but of a fifth embodiment of the invention.
Figure 11:
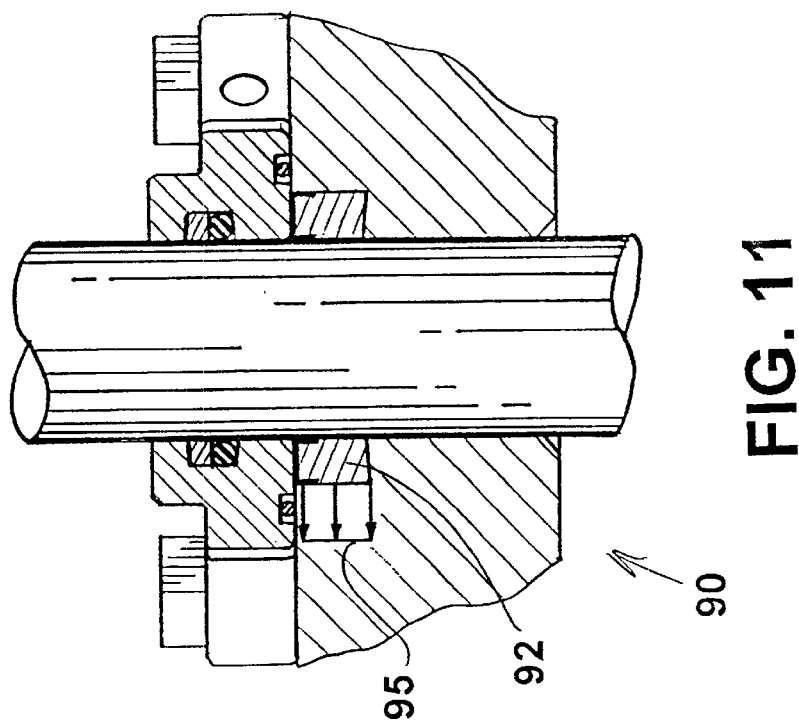

In FIGS. 11 and 12, a fifth embodiment assembly 90 is similar to the fourth embodiment of FIGS. 9 and 10 except for congruent tapering of the lower axial surface of packing ring 92 to match to tapering of stuffing box 94. The radial load distribution profile 95 is also uniform as seen in FIG. 11.

Figure 14:
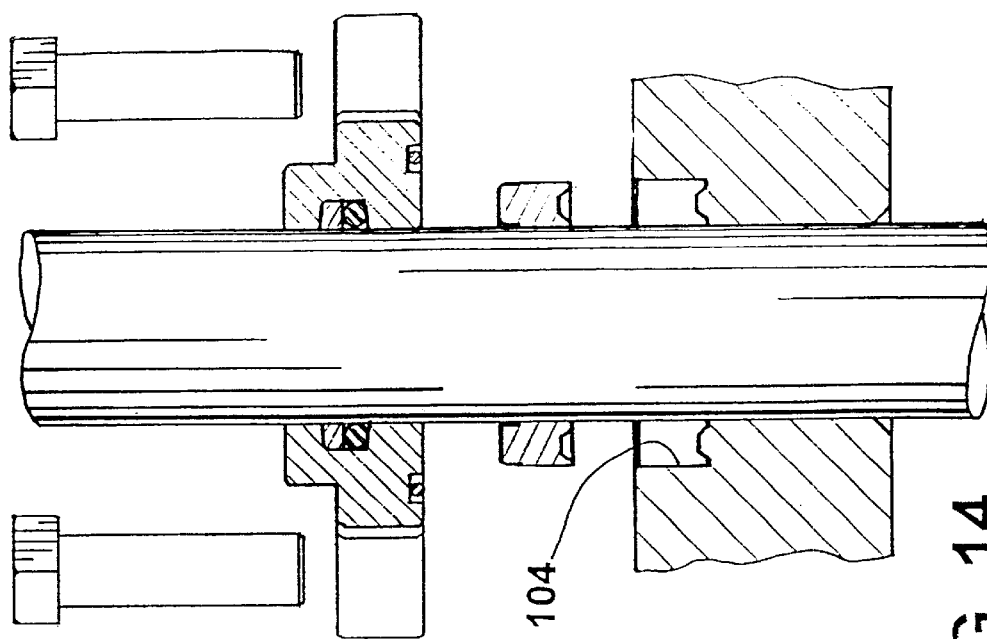
FIGS. 13 and 14 are views similar to FIGS. 1 and 2, but of a sixth embodiment of the invention.
Figure 13:
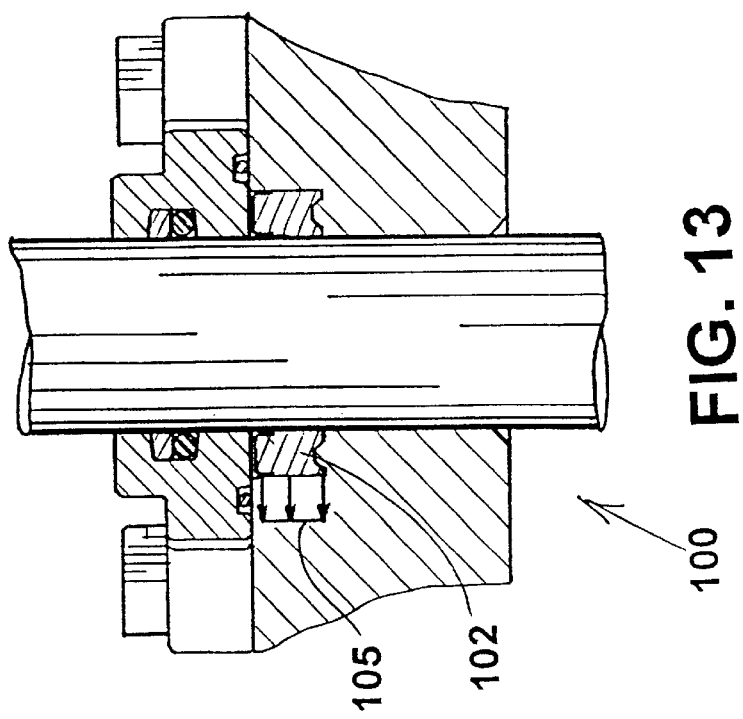

In FIGS. 13 and 14, a sixth embodiment assembly 100 has a packing ring 102 with a "V"-shaped bottom groove and a stuffing box 104 with a "V"-shaped protrusion to accept the packing ring groove. This configuration also produces an even radial load distribution profile 105 seen in FIG. 13.

Those having skill in the valve art will now understand that the present invention provides a more evenly distributed radial load distribution in a packing ring by employing a stuffing box having a non-rectangular cross-section formed by tapering at least one radial or axial surface of the stuffing box or by providing a protrusion in a surface of the stuffing box. Moreover, it will be observed that the packing ring may either be rectangular in cross-section or formed congruently to the cross-section of the stuffing box. It will now be apparent that there are numerous ways to produce a more even radial load distribution to enhance service life in the packing ring. Accordingly, the various embodiments shown herein are by no means the only ways to accomplish the objects of the invention. Indeed, with the benefit of the applicant's teaching herein, various modifications and additions will now readily occur to those in the valve art. Therefore, the invention is limited only by the scope of the appended claims and their equivalents.

I claim:

1. In a valve having a linearly moveable stem of cylindrical shape and uniform cross-section, a stuffing box receiving a packing ring for radially engaging the radial wall of the stem and a packing gland for compressing the packing ring; an improved stuffing box comprising a non-rectangular cross-section, at least one surface of said stuffing box being shaped to uniformly distribute radial loading of said packing ring against said stem, said at least one surface not in contact with said stem.

2. The improved stuffing box recited in claim 1 wherein said at least one surface comprises a tapered radial surface of said stuffing box.

3. The improved stuffing box recited in claim 1 wherein said at least one surface comprises a tapered axial surface of said stuffing box.

4. The improved stuffing box recited in claim 1 wherein said packing ring has a rectangular cross-section prior to installation in said stuffing box.

5. The improved stuffing box recited in claim 1 wherein said packing ring has a cross-section which is congruent with the cross-section of said stuffing box prior to installation of said packing ring into said stuffing box.

6. The improved stuffing box recited in claim 1 wherein said at least one surface comprises a "V"-shaped protrusion.

7. The improved stuffing box recited in claim 6 wherein said packing ring comprises a "V"-shaped groove for receiving said protrusion.

8. The improved stuffing box recited in claim 6 wherein said at least one surface is an axial surface of said stuffing box.

* * * * *